United States Patent
Fry et al.

(10) Patent No.: US 7,381,939 B2
(45) Date of Patent: Jun. 3, 2008

(54) OPTICAL CARGO DETECTION

(75) Inventors: Robert Fry, Ottawa (CA); Wayne McPherson, Ottawa (CA); David Roscoe, Ottawa (CA)

(73) Assignee: Transcore Link Logistics Corporation (CA)

( * ) Notice: Subject to any disclaimer, the term of this patent is extended or adjusted under 35 U.S.C. 154(b) by 251 days.

(21) Appl. No.: 11/142,671

(22) Filed: Jun. 2, 2005

(65) Prior Publication Data
US 2006/0274191 A1   Dec. 7, 2006

(51) Int. Cl.
*G01J 1/44* (2006.01)
(52) U.S. Cl. .............. 250/214 C; 250/214 B; 250/215 R; 398/151
(58) Field of Classification Search ........ 250/214 B, 250/213 C, 214 R, 221, 222.1, 559.11; 348/370; 398/151, 158, 159
See application file for complete search history.

(56) References Cited
U.S. PATENT DOCUMENTS

| | | | | |
|---|---|---|---|---|
| 3,920,970 A | * | 11/1975 | Slaker | .............. 702/40 |
| 5,099,113 A | * | 3/1992 | Oi et al. | ............... 250/214 B |
| 5,710,424 A | * | 1/1998 | Theodoras et al. | ...... 250/208.2 |
| 6,115,128 A | * | 9/2000 | Vann | .................. 356/623 |
| 6,211,784 B1 | * | 4/2001 | Nishide | ................ 340/568.1 |
| 6,753,950 B2 | * | 6/2004 | Morcom | ................ 356/4.01 |

\* cited by examiner

*Primary Examiner*—Georgia Y. Epps
*Assistant Examiner*—Kevin Wyatt
(74) *Attorney, Agent, or Firm*—Caesar, Revise, Bernstein, Cohen & Pokotilow, Ltd.

(57) ABSTRACT

A detector for detecting cargo in a container has a controller block, a transmitter for transmitting light into the field of view, a receiver for receiving reflected light, and a threshold comparator for determining whether the received light meets a threshold for cargo detection. The receiver includes a DC block for removing effects of ambient light. The detector performs detection multiple times and averages the results, which can be compared with a previously stored condition of cargo presence or absence to increase the detection accuracy further.

9 Claims, 3 Drawing Sheets

OPTICAL CARGO DETECTION

FIELD OF THE INVENTION

The present invention is directed to a system and method for detection of cargo and more particularly to such a system and method which can detect pallet-sized objects at a distance without being affected by ambient light such as sunlight.

DESCRIPTION OF RELATED ART

Reliable and inexpensive detection of pallet-sized objects within a defined area is a capability which has long been desired by the transportation and shipping industries. Those companies keep trailers/containers at secure lots, truck stops, customer facilities, and other designated areas depending upon need, convenience, and cost. In most cases, loading and unloading those containers is the responsibility of the customer; as a consequence, the shipper often does not know when their containers are ready for pickup. Knowing when their containers are loaded or unloaded allows the shipping companies to reduce their operating costs by using their containers more efficiently and enables them to identify and charge customers who do not promptly empty received containers but rather use them as storage facilities.

Previously disclosed object detectors use one of five techniques: ultrasonic detection, microwave detection, image detection, coherent light detection and non-coherent light detection.

Ultrasonic detectors emit pulses of high-frequency sound waves and then listen for the sound energy to be reflected back from nearby objects. In open area deployments, any reflected sound energy would signal the presence of an object. However, in confined space deployments such as a cargo container, sound energy will always be reflected back to the detector by the walls, floor and ceiling of the container. In that case, it is necessary for the detector to distinguish between those ever present reflections and reflections from additional objects in the container. Classification of the different reflections may be done by measuring the amplitude and/or time delay of the reflection in order to obtain distance information for the source of the reflection.

Microwave detectors emit microwave frequency electromagnetic energy and then similarly listen for the microwave energy to be reflected back to the detector. In enclosed spaces, those detectors use the amplitude of the reflected energy to detect the presence or movement of objects.

Image detectors use a digital camera or other suitable imaging device to capture an image of the inside of the container. That image is then digitally processed by software algorithms to determine if there are objects present in the image other than the components of an empty container. That detection method usually requires each detector to be trained to recognize the empty state of the container it is monitoring.

Coherent light detectors come in two different implementations. The first emits a beam of laser light (usually red or infrared) and watches for the light energy to be reflected back from an object. As with the acoustic detectors, the detector must be able to distinguish between light reflected from an object and light reflected from the inside of the container. Again, that determination can be made by measuring the amplitude or the time delay of the reflection in order to obtain distance information for the source of the reflection. The second implementation emits a beam of laser light towards a remotely located receiver. With that setup, detection of the light beam by the receiver indicates the absence of an object. If an object is present, it blocks the light beam, making its presence known to the receiver.

Non-coherent light detectors operate very similarly to coherent light detectors except that the light source is not coherent, i.e. it is not a laser.

However, the known techniques have the following drawbacks. For ultrasonic and microwave detectors, the need to eliminate readings from spurious reflections increases computational complexity and thus power draw. For image detectors, the training of each detector and the image processing increase complexity, cost, and power draw. For light detectors, either coherent or incoherent, the level of ambient light can effect the accuracy of detection. Also, when the detected signal is at or near a threshold, accurate detection can be difficult. For those reasons, light detection has not previously been used to detect the presence of cargo in a confined area.

SUMMARY OF THE INVENTION

There is thus a need in the art for a technique for cargo detection in a container which overcomes the above drawbacks.

It is therefore an object of the invention to provide a cargo detector with a low power draw.

It is another object of the invention to provide a cargo detector which is computationally simple.

It is still another object of the invention to provide a cargo detector which is not affected by spurious reflections.

It is still another object of the invention to provide a cargo detector which is not affected by ambient light levels.

It is still another object of the invention to provide a cargo detector which can accurately detect cargo even when the detection signal is at or near a threshold.

To achieve the above and other objects, the present invention is directed to a detector and method for detection of objects at relatively large distances and preferably for detection of pallet-sized objects (cargo) at distances of up to 40 feet. A preferred embodiment operates on the non-coherent light detection principle, in which it emits non-coherent light while watching for the light energy to be reflected back from an object within its field of view. The presence or absence of cargo is then determined based on the amplitude of the reflected light. The principles of operation are equally applicable to coherent light detection. The detector includes a DC block to remove the ambient light response.

The detector measures the reflected light power several times and averages the readings to reduce measurement noise. It can then compare the result of detection to the currently stored cargo state (empty or not empty) to determine whether it needs to take more measurements for greater accuracy.

The concept of using reflected light to detect the presence of an object is not by itself novel. However, the adaptation of such technology to detecting the presence of cargo within a confined area is new. The preferred embodiment can reliably detect objects at distances of 0-30 feet at a minimum and preferably up to 40 feet. Furthermore, the detector according to the preferred embodiment consumes very little current in order to maximize battery life. The present embodiment typically consumes 60 mAh/year when connected to a GlobalWave MT2000 transceiver and depending on the installation can detect objects over 40 feet away.

A reliable optical cargo detector has been invented. The detector is unaffected by ambient light including direct sunlight, can detect pallet sized objects up to 40 feet away within the confines of a 53 foot container and typically consumes only 60 mAh/year when connected to a Global-Wave MT2000 Transceiver.

BRIEF DESCRIPTION OF THE DRAWINGS

A preferred embodiment will be set forth in detail with reference to the drawings, in which.

DETAILED DESCRIPTION OF THE PREFERRED EMBODIMENT

Figure 1:
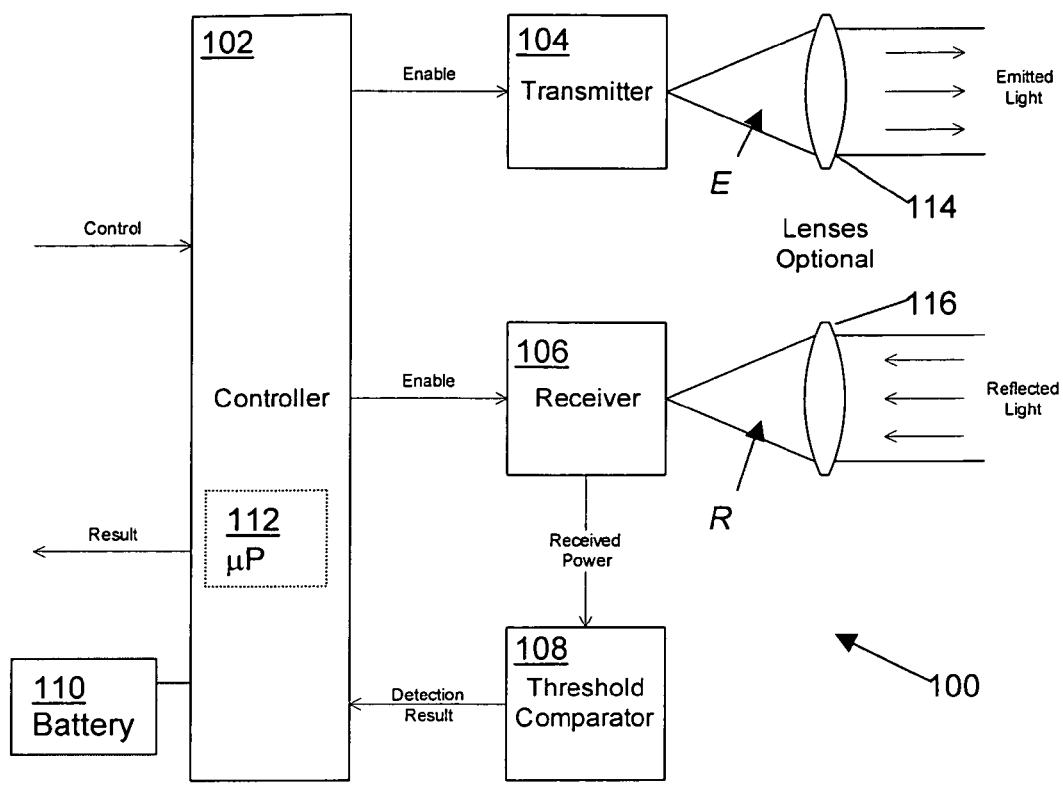
FIG. 1 is a block diagram of the detector according to the preferred embodiment.

A preferred embodiment will be set forth in detail with reference to the drawings, in which like reference numerals refer to like elements throughout.

FIG. 1 is a block diagram of the preferred embodiment of the invention. As shown in FIG. 1, the detector 100 includes a controller block 102 which enables and disables a transmitter block 104 and receiver block 106 as required and reads a detection result from a threshold comparator 108. The transmitter block 104 emits electromagnetic radiation E into an area in which cargo is to be detected (that is, the field of view of the detector 100). The receiver block 106 detects the reflected electromagnetic radiation R. The temperature compensating threshold comparator 108 discriminates over temperature between background reflections and those from an object placed within the field of view of the detector 100. All components of the detector 100 are powered by a power source such as a battery 110.

In the preferred embodiment, the controller 102 includes a microprocessor 112 with a built-in temperature sensor and analog-to-digital converter. Those capabilities allow the threshold comparator 108 to be incorporated into the controller block 102 by measuring the received power with the analog-to-digital converter and performing the temperature compensation and threshold comparison in software. Also included in the preferred embodiment is a pair of lenses, a first lens 114 to focus the light output from the transmitter 104 and a second lens 116 to concentrate the reflected light energy into the receiver 106. Those lenses serve to increase the range of the detector 100 and are therefore optional, depending on the desired field of view.

Figure 2:
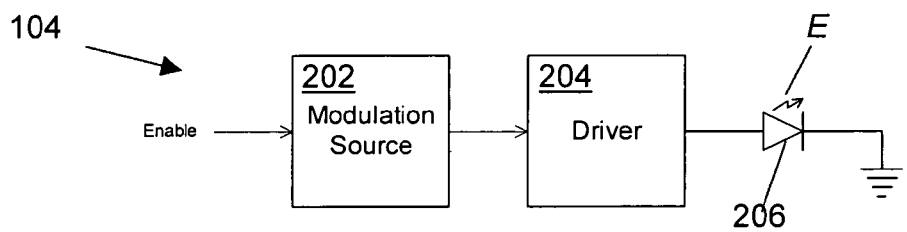
FIG. 2 is a block diagram of the transmitter of the detector of FIG. 1.

FIG. 2 shows a detailed block diagram of the transmitter 104. The transmitter 104 includes a modulation source 202 used to modulate the light intensity emitted by the detector 100, a driver block 204 to power the light source and an LED 206 to transform the electrical output of the driver into non-coherent light E. For the coherent light option, the LED would be replaced with a laser diode.

Figure 3:
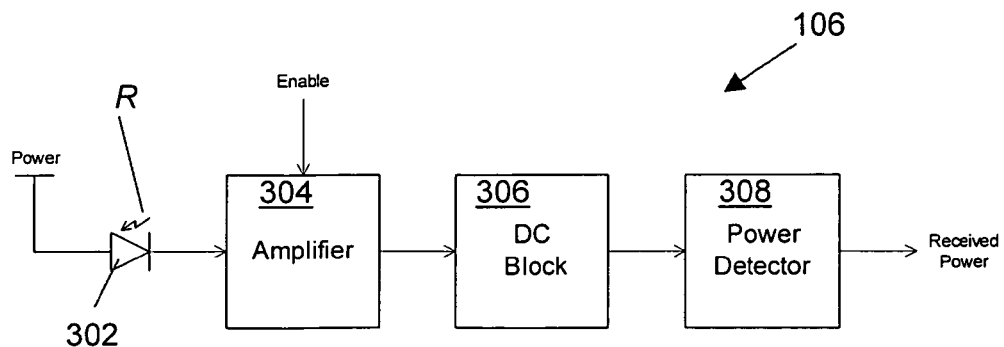
FIG. 3 is a block diagram of the receiver of the detector of FIG. 1.

FIG. 3 shows a detailed block diagram of the receiver 106. The receiver 106 includes a photodetector (photodiode) 302 for detecting the reflected light R, an amplifier block 304 to amplify the output of the photodiode, a DC block 306 to remove the ambient light response, and a power detector 308 to further amplify the signal and to measure the amplitude of the reflected light response. In the block diagram, the DC block 306 is shown after the amplifier for simplicity. In the preferred embodiment, the DC block 306 is actually incorporated into the amplifier block 304 to improve the performance of the amplifier block 304.

Figure 4:
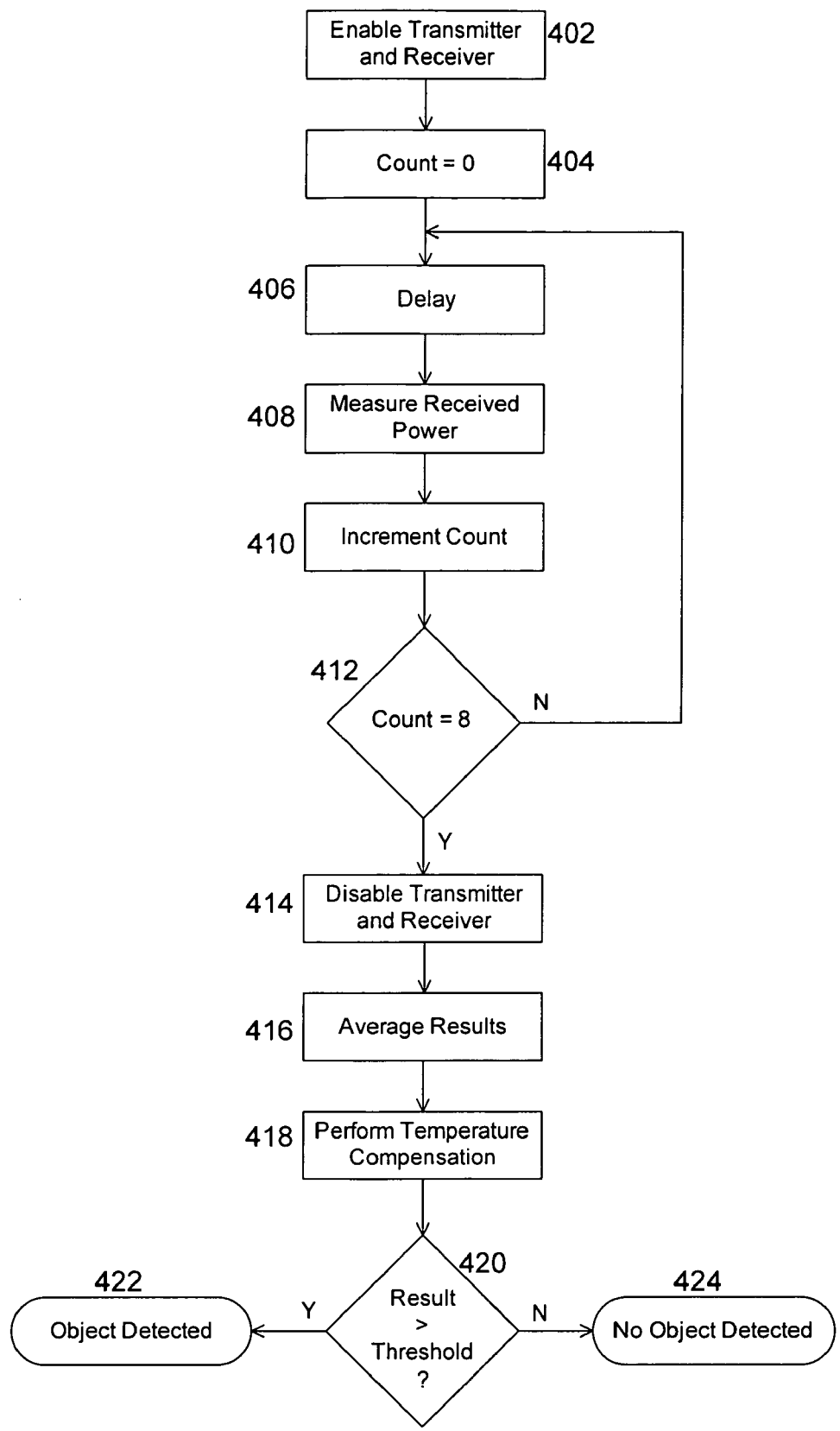
FIG. 4 is a flow chart of a single detection algorithm performed by the detector of FIG. 1.

FIG. 4 shows the algorithm used to perform a single detection. The algorithm starts in step 402 by turning on the transmitter and receiver. In step 404, the averaging count is initialized. After a short delay in step 406, the algorithm measures the reflected light power in step 408 and increments the averaging count in step 410. The algorithm performs steps 406, 408 and 410 a number of times (e.g., 8). Once it is determined in step 412 that the number of times has been reached, the algorithm turns off the transmitter and receiver in step 414. The readings are averaged in step 416 to reduce the measurement noise and then adjusted in step 418 to compensate for temperature. Finally, the adjusted result is compared to the detection threshold in step 420 to determine whether an object is detected, as in step 422, or not detected, as in step 424.

The algorithm of FIG. 4 has no built-in hysteresis, so that an object at the limit of detection can cause the algorithm to randomly toggle between detection and non-detection of an object. To solve that particular problem in a cargo sensing application, the algorithm of FIG. 5 is used.

Figure 5:
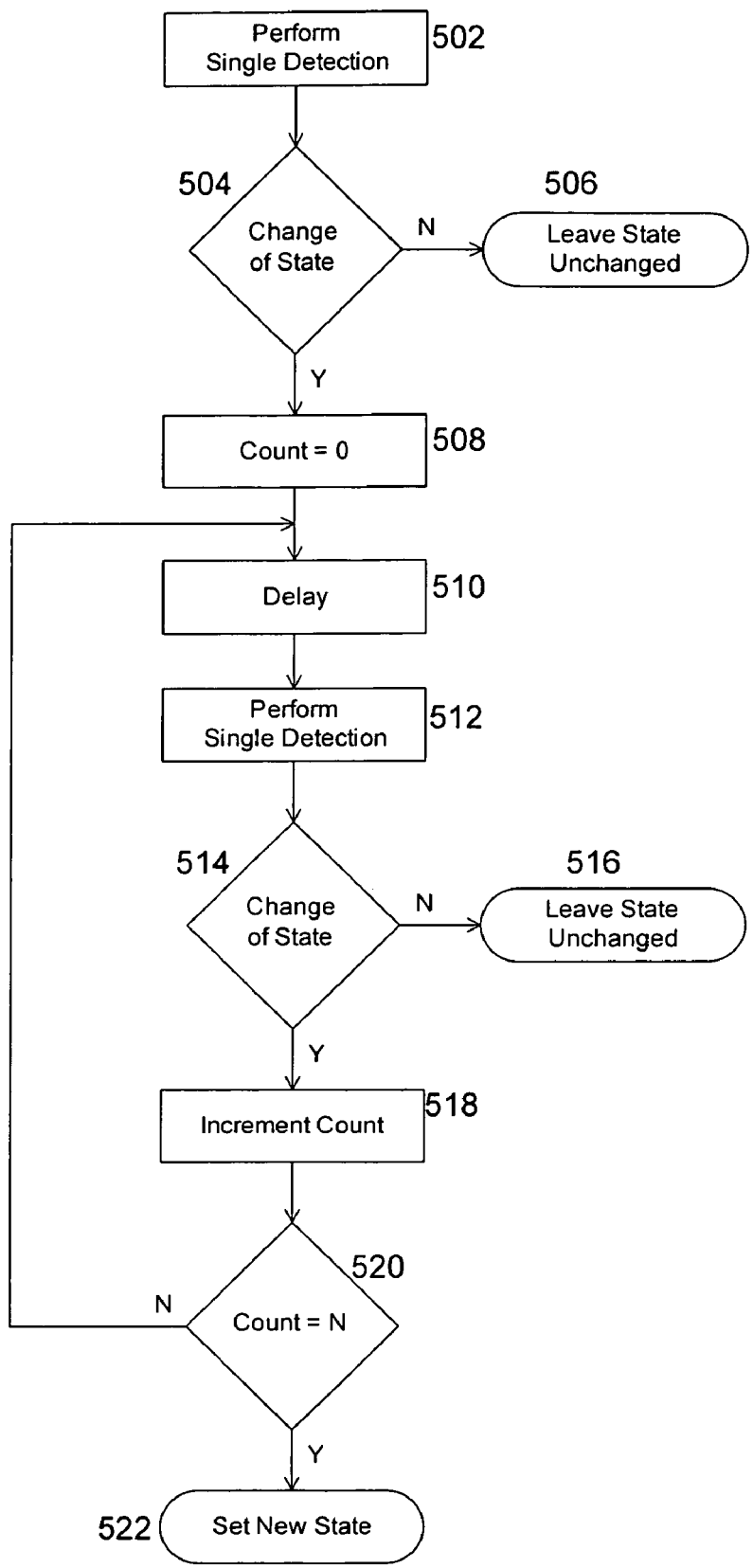
FIG. 5 is a flow chart of a cargo state detection algorithm for improving the accuracy of the algorithm of FIG. 4.

The algorithm of FIG. 5 starts by performing the single detection algorithm of FIG. 4 in step 502. If it is determined in step 504 that the result of the single detection algorithm is the same as the currently stored cargo state (empty or not empty), the cargo state is left unchanged, and the algorithm terminates in step 506. However, if it is determined in step 504 that the result of the single detection algorithm is not the same as the currently stored cargo state (i.e. the state appears to have changed), the algorithm then verifies the state change by taking up to N additional single detection measurements. More specifically, a count is initialized in step 508. After a delay in step 510, the algorithm performs a single detection in step 512, using the algorithm of FIG. 4. If it is determined in step 514 that the state has not changed, the state is left unchanged, and the algorithm terminates in step 516. If it is determined in step 514 that the state has changed, the count is incremented in step 518. Steps 510, 512, 514 and 518 are repeated until either step 516 is reached or it is determined in step 520 that the count has reached a predetermined maximum value. In the latter situation, it is determined that all of the follow-up measurements agree with the first measurement, and the cargo state is officially changed in step 522. If any of the follow-up measurements disagrees with the first measurement, the cargo state is left unchanged, and, as noted above, the algorithm immediately terminates in step 516.

While a preferred embodiment of the present invention has been set forth in detail above, those skilled in the art who have reviewed the present disclosure will readily appreciate that other embodiments can be realized within the scope of the present invention. For example, numerical values are illustrative rather than limiting. Also, as noted above, the detector can use either coherent or incoherent light; those skilled in the art will understand how to implement either. Moreover, components shown as discrete can be consolidated, while a component having multiple functions can be implemented as multiple discrete components. The same is true with method steps. Furthermore, the invention can be implemented to use transmissive rather than reflective detection. Therefore, the present invention should be construed as limited only by the appended claims.

What is claimed is:

1. A detector for detecting cargo in a field of view, the detector comprising:
   a transmitter for transmitting light into the field of view;
   a receiver for receiving light from the field of view and for removing DC components representing ambient light to output a detection signal;
   a threshold comparator for comparing the detection signal to a threshold to output a detection result representing a presence or absence of the cargo in the field of view;
   a controller block, in electrical communication with the transmitter, the receiver, and the threshold comparator, for controlling operation of the transmitter, the receiver, and the threshold comparator to operate a plurality of times to produce a plurality of said detection results and for averaging said plurality of detection results to produce a determination of whether the cargo is present in the field of view, wherein the controller block averages the plurality of detection results to produce an averaged result and applies temperature compensation to the averaged result; and
   a power source for powering the transmitter, the receiver, the threshold comparator and the controller block.

2. The detector of claim 1, wherein the power source comprises a battery.

3. The detector of claim 1, wherein the controller block comprises a microprocessor for sensing an ambient temperature and for applying the temperature compensation in accordance with the ambient temperature.

4. The detector of claim 3, wherein the threshold comparator is implemented in the microprocessor.

5. The detector of claim 1, wherein the controller block stores a current cargo state, compares the determination with the current cargo state, and, when the determination disagrees with the current cargo state, controls the transmitter, the receiver and the threshold comparator to produce the detection result until either (i) the detection result confirms the current cargo state, in which the current cargo state is unchanged, or (ii) the detection result is produced a predetermined number of times, in which case the current cargo state is changed.

6. A method for detecting cargo in a field of view, the method comprising:
   (a) transmitting light into the field of view;
   (b) receiving light from the field of view and removing DC components representing ambient light to output a detection signal;
   (c) comparing the detection signal to a threshold to output a detection result representing a presence or absence of the cargo in the field of view;
   (d) performing steps (a)-(c) a plurality of times to produce a plurality of said detection results; and
   (e) averaging said plurality of detection results to produce a determination of whether the cargo is present in the field of view, wherein step (e) comprises:
   (i) averaging the plurality of detection results to produce an averaged result; and
   (ii) applying temperature compensation to the averaged result.

7. The method of claim 6, further comprising:
   (f) storing a current cargo state;
   (g) comparing the determination with the current cargo state;
   (h) if the determination disagrees with the current cargo state, performing steps (a)-(c) until either the detection result confirms the current cargo state, in which the current cargo state is unchanged or the detection result is produced a predetermined number of times, in which case the current cargo state is changed;
   (i) if the detection result confirms the current cargo state, keeping the current cargo state unchanged; and
   (j) if the detection result is produced the predetermined number of times, changing the current cargo state in accordance with the determination.

8. A method for detecting cargo in a confined area, the method comprising:
   (a) transmitting light into the confined area;
   (b) receiving light reflected from the confined area and removing DC components representing ambient light to output a detection signal; and
   (c) comparing the detection signal to a threshold to output a detection result representing a presence or absence of the cargo in the confined area, further comprising:
   (d) performing steps (a)-(c) a plurality of times to produce a plurality of said detection results; and
   (e) averaging said plurality of detection results to produce a determination of whether the cargo is present in the field of view, wherein step (e) comprises:
   (i) averaging the plurality of detection results to produce an averaged result; and
   (ii) applying temperature compensation to the averaged result.

9. The method of claim 8, further comprising:
   (f) storing a current cargo state;
   (g) comparing the determination with the current cargo state;
   (h) if the determination disagrees with the current cargo state, performing steps (a)-(c) until either the detection result confirms the current cargo state, in which the current cargo state is unchanged or the detection result is produced a predetermined number of times, in which case the current cargo state is changed;
   (i) if the detection result confirms the current cargo state, keeping the current cargo state unchanged; and
   (j) if the detection result is produced the predetermined number of times, changing the current cargo state in accordance with the determination.

* * * * *